United States Patent
Mazyek et al.

(10) Patent No.: US 10,947,132 B2
(45) Date of Patent: Mar. 16, 2021

(54) SYSTEM AND METHODS FOR REMOVING DISSOLVED METALS FROM WASTEWATER STREAMS

(71) Applicant: CARBONXT, INC., Gainesville, FL (US)

(72) Inventors: David W. Mazyek, Gainesville, FL (US); Heather McKenna, Portland, OR (US); Christine O. Valcarce, Gainesville, FL (US)

(73) Assignee: CARBONXT, INC., Gainesville, FL (US)

( * ) Notice: Subject to any disclaimer, the term of this patent is extended or adjusted under 35 U.S.C. 154(b) by 667 days.

(21) Appl. No.: 15/486,580

(22) Filed: Apr. 13, 2017

(65) Prior Publication Data

US 2018/0297865 A1    Oct. 18, 2018

(51) Int. Cl.
| | | |
|---|---|---|
| C02F 1/32 | (2006.01) | |
| C02F 1/72 | (2006.01) | |
| C02F 1/28 | (2006.01) | |
| C02F 1/70 | (2006.01) | |
| C02F 101/20 | (2006.01) | |
| C02F 103/18 | (2006.01) | |
| C02F 103/34 | (2006.01) | |

(52) U.S. Cl.
CPC .............. *C02F 1/325* (2013.01); *C02F 1/725* (2013.01); *C02F 1/281* (2013.01); *C02F 1/70* (2013.01); *C02F 2101/20* (2013.01); *C02F 2103/18* (2013.01); *C02F 2103/34* (2013.01); *C02F 2201/32* (2013.01); *C02F 2305/10* (2013.01)

(58) Field of Classification Search
CPC ...... C02F 1/32; C02F 1/28; C02F 1/72; C02F 1/70; C02F 1/325; C02F 1/725; C02F 1/281; C02F 2305/10; C02F 2103/18; C02F 2103/34

See application file for complete search history.

(56) References Cited

U.S. PATENT DOCUMENTS

| | | | |
|---|---|---|---|
| 4,725,357 | A | 2/1988 | Downing et al. |
| 4,971,702 | A | 11/1990 | Renk |
| 5,264,133 | A | 11/1993 | Forschner et al. |
| 5,266,540 | A | 11/1993 | Menicagli et al. |
| 5,332,508 | A | 7/1994 | Foster et al. |

(Continued)

FOREIGN PATENT DOCUMENTS

| | | |
|---|---|---|
| CN | 104341022 A | 2/2015 |
| WO | WO 2016/030753 A1 | 3/2016 |

OTHER PUBLICATIONS

International Search Report and Written Opinion of PCT/US2018/027566 dated Aug. 1, 2018, 12 pp.

(Continued)

*Primary Examiner* — Cameron J Allen
(74) *Attorney, Agent, or Firm* — Berg Hill Greenleaf Ruscitti, LLP.

(57) ABSTRACT

A photocatalytic reaction unit for removing dissolved metals from a wastewater stream, including a photocatalytic reaction vessel having an inlet and an outlet for providing passage of the wastewater stream into and out of the photocatalytic reaction vessel; a photocatalyst for mixing with the wastewater stream; and an ultraviolet light source for emitting ultraviolet light into the photocatalytic reaction vessel.

14 Claims, 6 Drawing Sheets

(56) References Cited

U.S. PATENT DOCUMENTS

| | | | |
|---|---|---|---|
| 5,855,789 | A | 1/1999 | Smith et al. |
| 6,077,431 | A * | 6/2000 | Kawanishi ............... C02F 1/36 |
| | | | 210/361 |
| 6,183,644 | B1 | 2/2001 | Adams et al. |
| 6,235,204 | B1 | 5/2001 | Castaldi et al. |
| 6,328,939 | B1 | 12/2001 | Amrhein |
| 6,503,470 | B1 | 1/2003 | Nolan et al. |
| 6,673,738 | B2 | 1/2004 | Ueda et al. |
| 6,855,859 | B2 | 2/2005 | Nolan et al. |
| 7,037,474 | B2 | 5/2006 | Nolan et al. |
| 7,541,509 | B2 | 6/2009 | Sigmund et al. |
| 8,092,766 | B2 | 1/2012 | Ghorishi et al. |
| 8,178,065 | B2 | 5/2012 | Al-Zeghayer et al. |
| 8,231,711 | B2 | 7/2012 | Iannicelli |
| 2008/0179178 | A1 | 7/2008 | Cabello et al. |
| 2010/0193449 | A1* | 8/2010 | Shang ................. B01J 23/42 |
| | | | 210/763 |
| 2012/0012531 | A1 | 1/2012 | Al-Jlil |
| 2012/0024798 | A1 | 2/2012 | Pickett et al. |
| 2012/0267321 | A1 | 10/2012 | Kisailus et al. |
| 2015/0096941 | A1* | 4/2015 | Doudrick ............... C02F 1/70 |
| | | | 210/739 |

OTHER PUBLICATIONS

Ku et al. (2001) "Photocatalytic reduction of Cr(VI) in aqueous solutions by UV irradiation with the presence of titanium dioxide," Water Research, vol. 35, Issue 1, pp. 135-142.

International Preliminary Report on Patentability of PCT/US2018/027566 dated Oct. 15, 2019, 10 pp.

* cited by examiner

SYSTEM AND METHODS FOR REMOVING DISSOLVED METALS FROM WASTEWATER STREAMS

TECHNICAL FIELD OF THE INVENTION

This invention relates, in general, to removing contaminants from wastewater and, in particular, to a system and methods for removing dissolved metals from wastewater streams.

BACKGROUND OF THE INVENTION

Without limiting the scope of the present invention, its background will be described in relation to a system and methods for removing dissolved metals, dissolved semi-metals, non-metals that exhibit some metallic properties, and/or dissolved metalloids (hereinafter referred to as "metals or dissolved metals") from wastewater streams, as an example.

Amongst the numerous pollutants regulated by the EPA, mercury and mercury-containing compounds have been a source of significant concern due to their increasing rate of release and the lack of adequate control technologies. Although the concentrations released into the environment are usually low, it can transfer to various organisms, and then magnify up the food chain. For example, the concentration of accumulated mercury in some fish can reach levels that are millions of times greater than that in the water. The consumption of such fish by humans, and the resulting buildup of mercury in various tissues may lead to serious neurological and developmental effects such as losses of sensory or cognitive ability, tremors, inability to walk, convulsions, and even death. Methylmercury, the most common form of organic mercury, is almost completely incorporated into the blood stream, and can be transferred through the placenta and into all of the tissues of the fetus, including that of the brain.

The EPA has estimated that nearly 87% of anthropogenic mercury emissions are from waste (as in waste-to-energy facilities) and fossil fuel combustion (as in coal-fired power plants). Recognizing this, control technologies have been employed in an effort to capture mercury from combustion exhaust gases. Some of these technologies and/or products encourage the oxidation of elemental mercury so that it can be captured in wet flue gas desulphurization (WFGD) units downstream. Various groups have further developed the approach by adding chelating agents to the absorber fluid to keep the metal in solution, thereby preventing re-emission to the atmosphere (U.S. Pat. Nos. 6,328,939; 8,092,766). Currently about 15-25% of the coal-fired power plants in the US employ WFGDs; that number is expected to rise, as new plants may install the device for $SO_2$ capture. Accordingly, the number of plants generating mercury-containing wastewaters—that must be treated before discharge—is also expected to increase. Other industries (e.g., chlor-alkali and dental) that contain mercury in their wastewater are also facing more stringent environmental regulations.

Like mercury, selenium also has the potential to bioaccumulate, concentrating in the kidneys, liver, and gonads of aquatic life. Excess concentrations in waterways have resulted in death or reproductive damage for fish, reptiles, and birds. The toxicity, transport, and bioavailability of selenium are dependent upon its chemical form and oxidation state. It is present in waterways in a number of inorganic and organic forms, the most common being selenite ($SeO_3^{-2}$) and selenate ($SeO_4^{-2}$). Both species are highly soluble, making removal quite challenging. The World Health Organization has set a guideline concentration of 10 μg-Se/L, while in the United States the current drinking water limit is 50 μg-Se/L, although a new limit of 5 μg-Se/L has been proposed. For surface water in the US, the acute and chronic criteria set by the Clean Water Act are 20 and 5 μg-Se/L respectively.

Originating in the parent coal, selenium is released during the combustion process of coal-fired power stations, partitioning either into the flue gas or within the fly ash. When WFGDs are employed, the volatilized selenium is captured in the WFGD wastewater at concentrations typically between 0.1 and 5 mg/L. The fate of selenium in the fly ash is dependent upon the handling of the solid byproduct. Most fly ash is disposed of as a slurry in above-ground ponds, or dry in landfills. "Surface impoundment" ponds have been identified by the EPA as likely to leak pollution into ground and surface water bodies. Indeed, numerous cases have been, and continue to be, identified where selenium from coal combustion byproducts has been released into water bodies at toxic levels. According to the National Research Council, it is the most frequently cited pollutant originating from coal combustion wastewaters impacting the environment.

Clearly, the removal of metals in general—and mercury and selenium in particular—from water bodies is critical to maintaining the health and well-being of the environment and its populous. While water treatment technologies targeting metals exist (Table 1), the complex chemistry of industrial wastewaters confounds the processes, making them inefficient and insufficient for meeting regulatory requirements. For example, selenium removal is most commonly accomplished via chemical co-precipitation with iron salts. However, certain additives and inorganic constituents can hinder the necessary reduction reactions such that most systems cannot reach the regulatory concentrations. Some have sought to improve performance by removing interfering compounds. For example, Castaldi and coworkers (U.S. Pat. No. 6,235,204) noted that the precipitation of selenium from wastewaters using ferrous ions was completely inhibited by sulfur-containing organic additives. The oxidation of said interfering compounds in a pretreatment step improved the performance of ferrous reduction/precipitation mechanisms. Nevertheless, the entire treatment process (pre-oxidation, ferrous/selenium reaction, settling, and sludge stabilization) can take greater than fifteen hours to complete, resulting in high CAPX requirements. Furthermore, treatment options that implement, for example, precipitation introduce metals required for the reactions that may then undesirably appear in the discharge water. Precipitation has also been used for mercury removal (U.S. Pat. Nos. 6,503,470; 7,037,474; 6,855,859), yet this general approach can produce a large volume of hazardous sludge and cannot reliably meet discharge limits.

Adsorption or capture via reduction mechanisms onto solid filtration media are attractive methods of selenium removal because of the ease of application and disposal of the spent media. Example of media used for metals removal include the following: zero valent iron, activated alumina, aluminosilicates and alumino-phosphate materials (U.S. Pat. No. 5,264,133), ferrihydrate, clay mixtures (US Patent Application US2012/0012531), peat moss and fly ash (U.S. Pat. No. 4,971,702), sulfidized minerals (U.S. Pat. No. 8,231,711) and synthetic polymer adsorbents (U.S. Pat. No. 5,855,789). Although these materials can technically adsorb the target metal, the high ionic strength of WFGD wastewaters can shield electrostatic attraction forces, dramatically lowering performance. Furthermore, anions and organic additives—often used to minimize scaling or mercury re-emission can hinder removal. These compounds preclude the use of membranes for treatment because they can foul the delicate material. Membrane systems also have comparatively high capital and operating expenses.

Because of the difficulties noted above, attention has recently turned towards using biological treatment for metals removal from water. This approach has been particularly successful in pilot-scale bioreactors for selenium removal, and a number of inventions have been developed using this approach (US Patent Application 2012/0024798 A1; U.S. Pat. Nos. 6,183,644; 4,725,357). The process relies on the ability of a specific strain of bacteria to anaerobically reduce selenate and selenite to elemental selenium, which deposits in and around the cells. The reactor can be configured as an upflow anaerobic sludge blanket reactor (UASBR), fluidized bed reactor, sequential batch reactor, slow sand filter (SSF), or some other packed bed arrangement where a microbial film is maintained on a support media. Fixed bed systems retain more of the elemental selenium, as compared to sludge blanket or fluidized bed systems, and therefore are more successful at achieving low discharge concentrations. The disadvantage to biological systems is that their performance is dependent on temperature, water chemistry, and selenium chemistry. Fluctuations in the parameters can slow or disrupt selenium capture, making the system less reliable. It also requires a skilled operator to maintain adequate performance. Furthermore, the microbes used for selenium removal do not capture mercury. In those situations where both metals are targeted for removal—such as the treatment of wastewaters at coal-fired power plants—two entirely different systems would need to be applied.

TABLE 1

Treatment Methods for Selenium Removal from Water and Wastewater

| Physical | Chemical | Biological |
| --- | --- | --- |
| Reverse Osmosis | Reduction | Volatilization |
| Nanofiltration | Iron precipitation | In-Situ Treatment |
| Ion Exchange | Cementation | Bioreactor |
| Deep Well Injection | | Treatment Wetland |
| Evaporation | | |
| Adsorption | | |

While a variety of methods have been developed to capture aqueous metals, they either cannot achieve low concentrations to meet discharge limits, require extended treatment times that are unreasonable for large scale processes, cannot capture different metals simultaneously, or are sensitive to the influent solution chemistry and/or temperature. Therefore, there is a need for a robust technology that can rapidly remove resilient metals, such as selenium and mercury, from waters and wastewaters with complex chemistry.

Additionally, it is known to combine the use of adsorbents and photocatalysts for the removal of biological or chemical pollutants (U.S. Pat. Nos. 6,673,738; 8,178,065; 7,541,509). These processes implant the photocatalyst onto the carbon surface directly. In other words, the application involves the use of one single media, which consists of a photocatalyst deposited on an adsorbent material, in one single treatment process. Other processes are known for the express purpose of regenerating the adsorbent (U.S. Pat. No. 5,266,540). In that disclosure, a sorbent is used to capture organic chemicals, and then once exhausted is regenerated using an irradiated semiconductor slurry.

SUMMARY OF THE INVENTION

The present invention disclosed herein is directed to a system and methods for removing dissolved metals from wastewater streams. In one embodiment, it is directed to a photocatalytic reaction unit for removing dissolved metals from a wastewater stream, including a photocatalytic reaction vessel having an inlet and an outlet for providing passage of the wastewater stream into and out of the photocatalytic reaction vessel; a photocatalyst in contact with the wastewater stream; and an ultraviolet light source for emitting ultraviolet light into the photocatalytic reaction vessel.

In one aspect, the photocatalyst may be titanium dioxide. In another aspect, the wavelength of the ultraviolet light source is from about 200 nm to about 400 nm. In yet another aspect, the wavelength of the ultraviolet light source may be 254 nm. Additionally, the photocatalytic reaction unit may further include at least one organic additive selected from the group consisting of formic acid, salicylic acid, methanol, ethanol, and citric acid for fostering electron/hole charge separation on the irradiated photocatalyst in the photocatalytic reaction vessel.

In still yet another aspect, the photocatalytic reaction unit may include at least one electron scavenger remover selected from the group consisting of purging with an inert gas, applying a de-aeration system, and adding an oxygen scavenger for decreasing the concentration in the photocatalytic reaction vessel of electron scavengers. Also, the photocatalytic reaction unit may further include a pretreatment unit disposed upstream of and in fluid communication with the photocatalytic reaction unit, the pretreatment unit providing one or more pretreatments selected from the group consisting of hydrogen peroxide/ultraviolet treatment, ozonation, photo-Fenton treatment, ultraviolet treatment, treatment by hypochlorite ions, treatment by a slurry of photocatalyst irradiated with ultraviolet light, sedimentation treatment, filtration treatment, chemical treatment, and an adsorption process for pretreating the wastewater stream prior to reacting in the photocatalytic reaction vessel.

In still yet another aspect, the photocatalytic reaction unit may include a regeneration unit for regenerating the photocatalyst, the regeneration unit selected from the group consisting of changing the slurry pH, thermal regeneration, photocatalytic oxidation, or combination thereof.

In another embodiment, the present invention may be directed to a system for removing dissolved metals from a wastewater stream, including a photocatalytic reaction vessel having an inlet and an outlet for providing passage of the wastewater stream into and out of the photocatalytic reaction vessel; a photocatalyst; an ultraviolet light source for emitting ultraviolet light into the photocatalytic reaction vessel; and a volatile metal capture unit for capturing volatized metals.

In one aspect, the system may further include a volatile metal capture unit for capturing volatized metals. In another aspect, the system may further include a pretreatment unit disposed upstream of and in fluid communication with the photocatalytic reaction unit, the pretreatment unit providing one or more pretreatments selected from the group consisting of hydrogen peroxide/ultraviolet treatment, ozonation, photo-Fenton treatment, ultraviolet treatment, treatment by hypochlorite ions, treatment by a slurry of photocatalyst irradiated with ultraviolet light, sedimentation treatment, filtration treatment, chemical treatment, and an adsorption process for pretreating the wastewater stream prior to reacting in the photocatalytic reaction vessel. Also, the system may further include a photocatalyst separation unit disposed downstream of and in fluid communication with the photocatalytic reaction vessel for separating the photocatalyst from the wastewater stream.

In another aspect, the system may include a photocatalyst storage unit disposed downstream of and in fluid communication with the photocatalyst separation unit for storing the photocatalyst. Additionally, the system may further include a photocatalyst recycle line providing fluid communication between the photocatalyst storage unit and the photocatalytic reaction vessel for providing photocatalyst from the photocatalyst storage unit to the photocatalytic reaction vessel. In yet another aspect, the system may further include a photocatalyst regeneration unit disposed downstream of and in fluid communication with the photocatalyst storage unit for regenerating the photocatalyst. Further, the system may include a regenerated photocatalyst recycle line in fluid communication between the photocatalyst regeneration unit and the photocatalytic reaction vessel for providing photocatalyst from the regenerated photocatalyst recycle line to the photocatalytic reaction vessel.

In another embodiment, the present invention is directed to a method for removing dissolved metals from a wastewater stream, including providing a source of the wastewater stream to a photocatalytic reaction vessel; contacting a photocatalyst with the wastewater stream; decreasing the concentration of electron scavengers; irradiating the wastewater stream for freeing electrons from the photocatalyst; impairing the recombination of the electrons and the photocatalysis; reducing the oxidation state of the dissolved metals. In one aspect, the method may include regenerating the photocatalyst.

In another aspect, decreasing the concentration of electron scavengers includes at least one of the group consisting of: purging the wastewater stream with an inert gas in the photocatalytic reaction vessel, de-aerating the wastewater stream in the photocatalytic reaction vessel, and adding an oxygen scavenger for decreasing the concentration in the photocatalytic reaction vessel of electron scavengers. In yet another aspect, impairing the recombination of the electrons and the photocatalysis, includes adding an organic additive selected from the group consisting of formic acid, salicylic acid, methanol, ethanol, and citric acid in the photocatalytic reaction vessel.

Also, the method may further include pretreating the wastewater stream prior to transferring the wastewater stream to the photocatalytic reaction vessel. Additionally, pretreating the wastewater stream may further include providing one or more pretreatments selected from the group consisting of hydrogen peroxide/ultraviolet treatment, ozonation, photo-Fenton treatment, ultraviolet treatment, treatment by hypochlorite ions, treatment by a slurry of photocatalyst irradiated with ultraviolet light, sedimentation treatment, filtration treatment, chemical treatment, and an adsorption process for pretreating the wastewater stream prior to reacting in the photocatalytic reaction vessel.

In still yet another aspect, irradiating the wastewater stream may further include irradiating the photocatalyst at a wavelength of from about 200 nm to about 400 nm. Further, irradiating the wastewater stream may include irradiating the photocatalyst at a wavelength of 254 nm. Also, the photocatalyst may be titanium dioxide.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not limit the scope of the present invention.

Generally, invention disclosed herein is directed to the removal of metals from water or wastewater streams by, in some cases, pretreating the liquid with a chemical process or adsorption process, followed by photocatalytic reduction of the target metals. Not wishing to be bound by theory, the pretreatment is thought to create favorable water quality conditions for photocatalytic reduction of the target metal. The combination of pretreatment followed by photocatalytic reduction as taught herein is not obvious or expected, because the chemistry of each wastewater type varies significantly.

Figure 1:
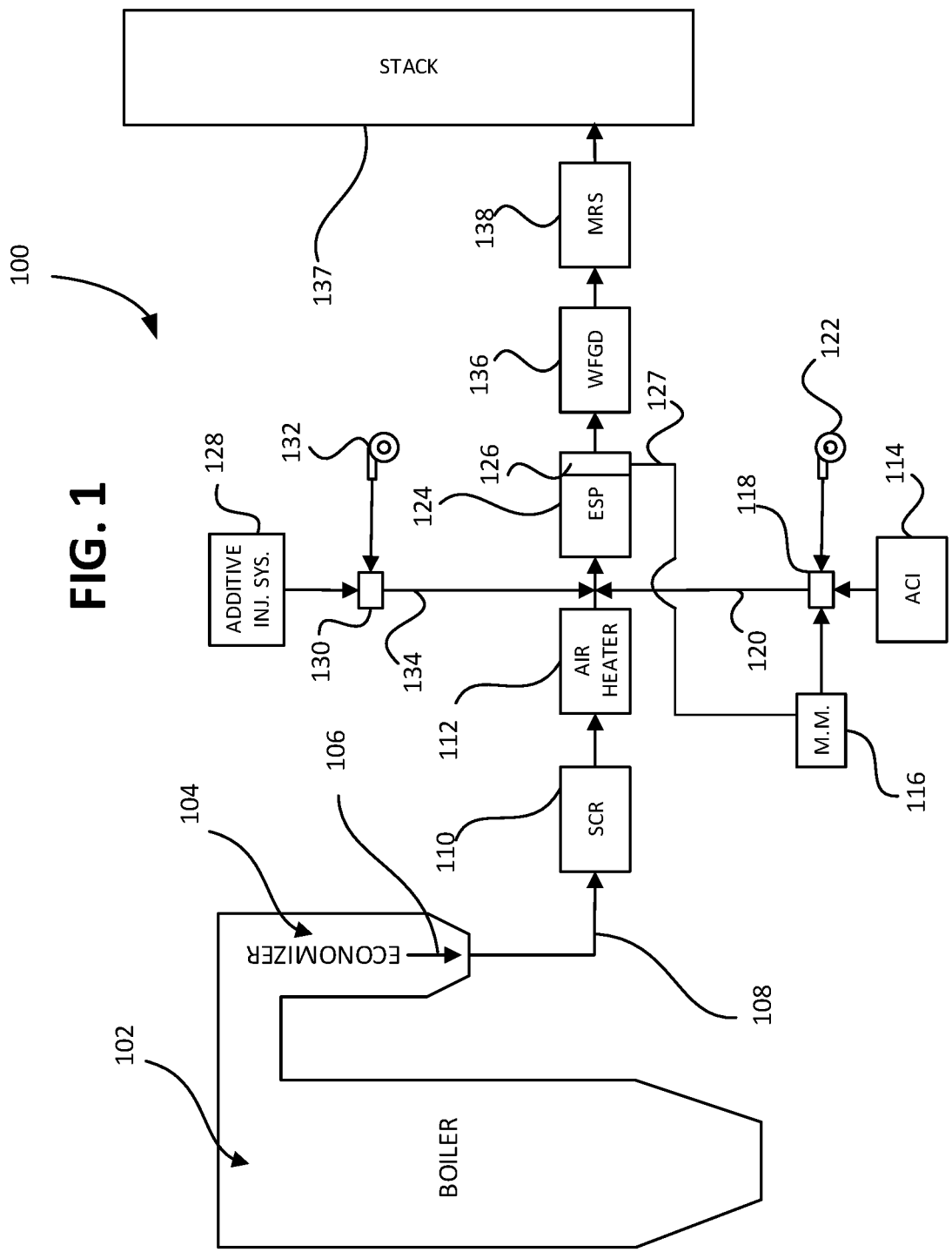
FIG. 1 is a block diagram of a system for removing dissolved metals from fluid streams according to an embodiment.

Referring initially to FIG. 1, an embodiment of a source of dissolved metals and a system for removing dissolved metals from wastewater streams is schematically illustrated and generally designated operation 100. In one embodiment, system 100 may include a coal-fired electric power generation plant. System 100 may include a boiler 102, such as for a coal-fired power plant. Although the example described herein applies to coal-fired power plants, the process gas/fluid stream or flue gas to be treated may originate from many industrial facilities such power plants, cement plants, waste incinerators, or other facilities that will occur to one skilled in the art.

Such gas streams contain many contaminants and/or pollutants, such as mercury, selenium, arsenic, and the like, that are desirable to control and/or decrease in concentration for protection of health and the environment. Nevertheless, system 100 is being described for removing, controlling, and/or reducing the oxidation state of dissolved metals, such as mercury and selenium, from a WFGD effluent stream of a coal-fired power plant using the systems and methods as discussed herein. Boiler 102 may be a coal-fired boiler that burns or combusts coal to heat water into superheated steam for driving steam turbines that produce electricity. These types of power plants are common throughout the U.S. and elsewhere. Optionally, boiler 102 includes the addition of oxidizing compounds which serve to oxidize mercury and other metals in the flue gas stream 106. Boiler 102 may further include an economizer 104, in one embodiment. Economizer 104 may be used to recover heat produced from boiler 102.

The flue gas or process gas/fluid stream 106 exiting boiler 102 and/or economizer 104 may then be flowed, transported, ducted, piped, etc. via one or more process lines 108 to an optional selective catalytic reduction unit 110 for the removal of nitrogen containing compounds, in one embodiment. Typically, selective catalytic reduction unit 110 may convert $NO_x$ compounds to diatomic nitrogen ($N_2$) and water ($H_2O$) using a catalyst and a gaseous reductant, such as an ammonia containing compound.

Process gas/fluid stream 106 may then be flowed, transported, ducted, piped, etc. to a heat exchanger, pre-heater, and/or air heater 112 where heat is transferred from fluid stream 106 to a feed of air to be fed back into boiler 102.

System 100 may further include one or more activated carbon injection ("ACI") devices, units, systems, etc. (ACI unit 114). ACI unit 114 may include an activated storage vessel, such as a powdered activated carbon (PAC) storage vessel. Such vessels may be silos, and the like where activated carbon, such as PAC, may be stored for use in system 100. Activated carbon silo (not shown) may be any type of storage vessel such that it is capable of containing a supply and/or feedstock of activated carbon, such as PAC, for supplying the activated carbon to process gas/fluid stream 106 of system 100. Some additional exemplary activated carbon silos may include supersacs, silos, storage vessels, and the like.

PAC may be injected anywhere along process line 108, but preferably it is injected upstream of an electrostatic precipitator as described further below. In one embodiment, system 100 may include one or more fluidizing nozzles (not shown) that may assist in providing PAC in a fluidized form, such that it may be transported in a substantially fluid form downstream in system 100. Additionally, system 100 may include one or more control valves (not shown) that may be disposed and/or located substantially proximal to the exit or outlet of PAC and/or fluidizing nozzles for controlling the flow of PAC from ACI unit 114 to system 100. The feed of PAC can also be controlled by a series of additional control valves, movable barriers, etc. (not shown). To assist the process of fluidizing activated carbon for exiting ACI unit 114, fluidization assistance may be applied in the form of physical agitation or the use of fluidizing nozzles. In addition, system 100 may include other types of control valves, such as manual valves (not shown), and the like as would be known to those skilled in the art. In one embodiment, system 100 may not include ACI unit 114.

In one embodiment, system 100 may include a magnetic material injection unit/device 116 that injects magnetic material into the stream of PAC from ACI unit 114. A meter 118 may be used to meter the amount of magnetic material as described herein into the stream of PAC being supplied in process line 120 prior to injection into process gas/fluid stream 106. In addition, system 100 may include a pneumatic device/unit 122 for providing a source of gas, fluid, etc., such as air, for blending the ACI from ACI unit 114 and the magnetic material from magnetic material injection unit 116. Pneumatic device 122 may be located in any desirable location, including in communication with process line 120 and/or meter 118. In one embodiment, system 100 may not include magnetic material injection unit 116.

Process gas/fluid stream 106 may then be optionally transferred via process line 108 to an electrostatic precipitator 124 for removal of particulates contained in process gas/fluid stream 106, in one example. Additionally, electrostatic precipitator 124 may include a magnetic material recovery device/unit 126 for removing the magnetic material from process gas/fluid stream 106 or particulate stream. In another embodiment, electrostatic precipitator 124 may not include magnetic material recovery unit 126. The recovered magnetic material may be transported back to magnetic material injection unit 116 via process line 127, in one embodiment. In another embodiment, process line 127 may feed a different storage/injection point of magnetic material. In one embodiment, system 100 may not include magnetic material recovery device/unit 126.

System 100 may also include an additive injection device/unit 128 for injecting one or more compounds, chemicals, etc., such as organosulfides, inorganic sulfides, acids, bases, metal oxides, oxides, metals, photocatalysts, and/or minerals to aid with sorbent performance. Preferably, additive injection unit 128 is located upstream of electrostatic precipitator 124 for injecting these compounds and/or chemicals prior to injection of activated carbon products as discussed herein.

In one embodiment, system 100 may include a meter 130 that may be used to meter the amount of additional additive as described herein into the stream of process gas/fluid stream 106 being supplied in process line 134 prior to injection into process gas/fluid stream 106. In addition, system 100 may include a pneumatic device/unit 132 for providing a source of gas, fluid, etc., such as air, for providing pneumatic force for transporting the additional additive to process gas/fluid stream 106. Pneumatic device 132 may be located in any desirable location, including in communication with process line 134 and/or meter 130. In another embodiment, additive injection device/unit 128 may be in communication with meter 118 for providing a metered mass of additional additive to process gas/fluid stream 106 via process line 120. In one embodiment, system 100 may not include an additive injection device/unit 128.

The treated process gas/fluid stream 106 may then be sent to a WFGD 136 via process line 108 for removal of sulfur compounds, in one embodiment. In another embodiment, WFGD 136 may remove sulfur compounds and oxidized metals. In this embodiment, chemical oxidants may be injected into boiler 102 prior to removing the sulfur compounds and oxidized metals in WFGD 136. After being treated in WFGD 136, treated process gas/fluid stream 106 may then be sent to a stack 137 for emission into the environment. The effluent from WFGD 136 may then be treated in a metals removal system 138 after solids separation as further described below. In one embodiment, the effluent 142 from WFGD 136 is the influent 142 to metals removal system 138.

In general, effluent 142 may include dissolved metals 140, such as is commonly known to those skilled in the arts. The aqueous or dissolved metals 140 may include, but are not limited to, the following (singular, or in combination): selenium, arsenic, copper, chromium, mercury, and lead. Although, dissolved metals 140, is discussed above primarily with relation to a WFGD, the present invention may be used with any types of contaminated influents/effluents at industrial plants, pollution recovery sites, and the like.

For example, effluent 142 may be any wastewater type and may include, but is not limited to, the following: surface water, ground water, surface mine discharge water, and wastewaters or runoff generated at electric generating facilities, municipal solid waste incineration facilities, chemical manufacturing facilities, petroleum coke processing facilities, chlor-alkali facilities, and agricultural sites. Preferably, the systems and methods described herein address the removal of selenium, arsenic, and mercury from wastewater. More preferably, the systems and methods taught herein address the removal of selenium, arsenic, and mercury from WFGD wastewater generated at coal-fired power plants.

Typically, WFGDs treat a source of process gas, waste gas, etc. such as a boiler for a coal-fired power plant as described above. Although the example described herein applies to coal-fired power plants, the process gas or flue gas and resulting effluents involved in the processes to be treated may originate from many industrial facilities such as power plants, cement plants, waste incinerators, or other facilities that will occur to one skilled in the art. Such effluent streams contain many contaminants, such as dissolved metals including selenium, arsenic, and mercury, that are desirable to decrease in concentration for protection of health and the environment. In one embodiment, system 100 may also include a solids separation unit (not shown) for removing solids from the effluent of WFGD 136.

Figure 2:
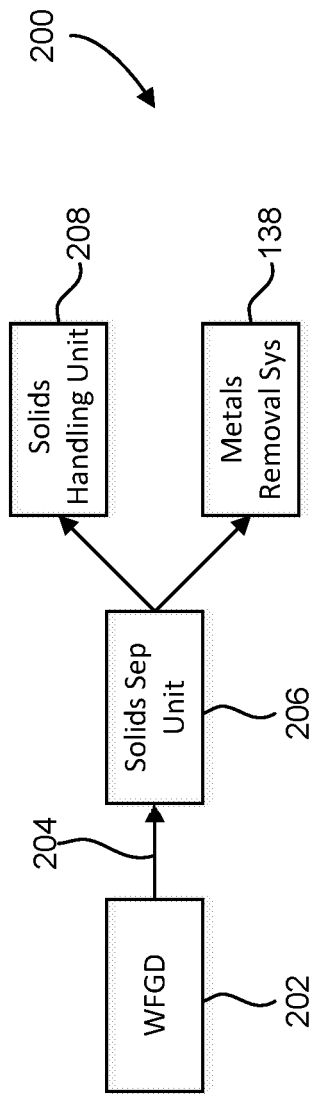
FIG. 2 is a block diagram of a system for removing dissolved metals from fluid streams according to another embodiment.

Turning now to FIG. 2, an embodiment of a source of dissolved metals and a system for removing dissolved metals from wastewater streams is schematically illustrated and generally designated operation 200. System 200 may include WFGD 136 that provides an effluent 142 to a solids separation unit 202 for separating solids from effluent 142 as described with reference to FIG. 1. In one embodiment, the separated solids may be transferred to a solids handling unit 204 for handling the solids. The separated effluent 142 may be flowed, transported, ducted, piped, etc. to metals removal system 138. Effluent 142 may then be treated at metals removal system 138 as described herein. System 200 may not include all of the units and the like of system 100.

Figure 3:
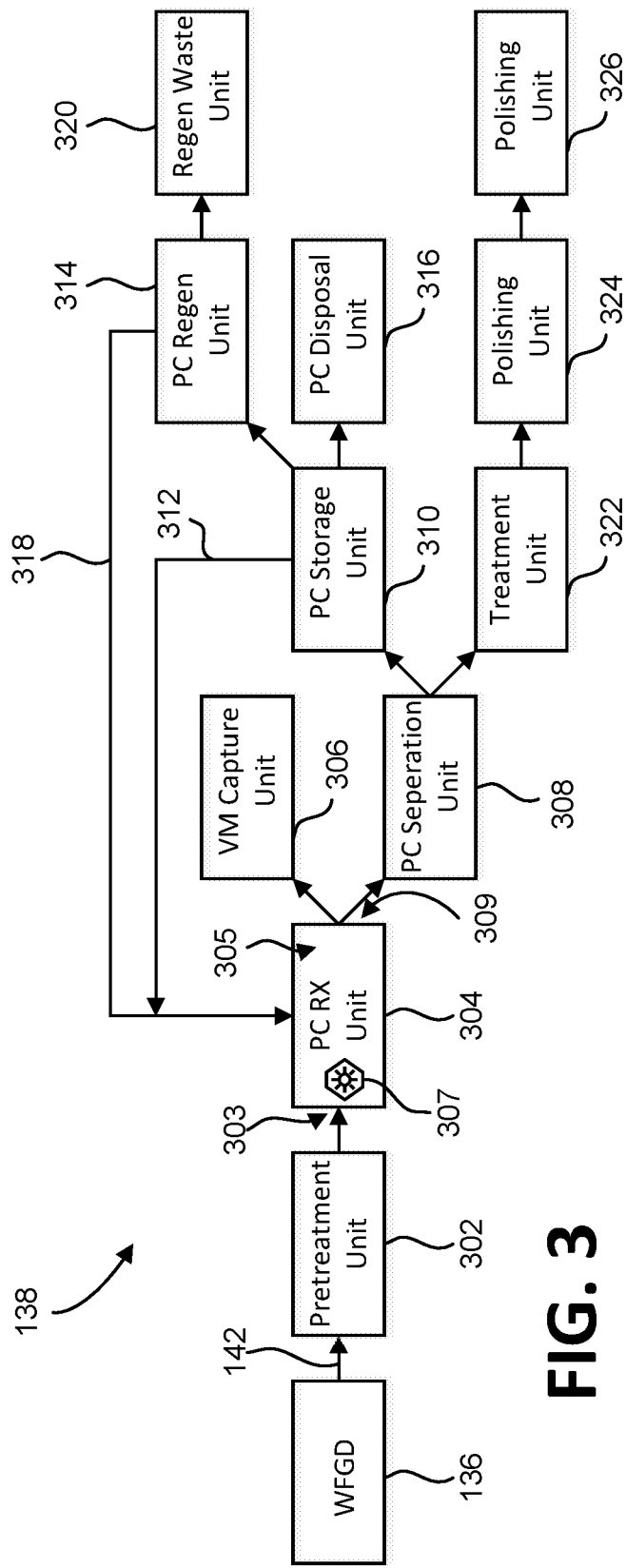
FIG. 3 is block diagram of a photocatalytic reaction unit for removing dissolved metals from fluid streams according to an embodiment.

Referring now to FIG. 3, an embodiment of metals removal system 138 is shown. Metals removal system 138 may receive effluent 142 from one or more of WFGD 136 and solids handling unit 204. Metals removal system 138 may further include a pretreatment unit 302 that is located downstream from one or more of solids handling unit 204 and WFGD 136. Effluent 142 may be flowed, transported, ducted, piped, etc. from one or more of solids separation unit 202 and WFGD 136 to pretreatment unit 302, in one aspect. Preferably, an embodiment of metals removal system 138 is directed to the pretreatment of effluent 142 to create favorable water quality conditions for subsequent photocatalytic reduction as further described below. In one embodiment, the pretreatment at pretreatment unit 302 involves the use of advanced oxidation processes (AOPs).

AOPs are frequently used to disinfect or degrade pollutants in water and air streams. Table 1 below presents the relative oxidative power of some common chemicals. The most powerful of these, the hydroxyl radical, can be generated through a variety of means including UV irradiation of hydrogen peroxide ($H_2O_2 + h\nu \rightarrow 2OH^*$) and heterogeneous photocatalysis. While the mechanism will certainly vary according to the target compound, oxidation by hydroxyl radicals can proceed by hydrogen abstraction or the breaking of unsaturated bonds until complete mineralization is achieved.

TABLE 1

Relative power of some oxidants

| Species | Oxidation Power, Relative to Chlorine |
|---|---|
| Hydroxyl Radical (OH*) | 2.06 |
| Ozone | 1.52 |
| Hydrogen Peroxide | 1.31 |
| Permanganate | 1.24 |
| Perhydroxyl radical (HOO*) | 1.25 |
| Chlorine dioxide | 1.15 |
| Chlorine | 1.00 |

The AOP pretreatment may include, but is not limited to, $H_2O_2$/UV treatment, ozonation, photo-Fenton treatment, UV treatment, the application of hypochlorite ions, the application of a slurry of photocatalyst irradiated with ultraviolet (UV) light, sedimentation systems, filtration systems, chemical treatment or some combination thereof.

In another embodiment, the pretreatment at pretreatment unit 302 may involve adsorption. The adsorbent may be applied by using a packed bed in a flow through arrangement or by dosing a powdered adsorbent followed by the separation of the powdered adsorbent from the fluid stream. The powder or granular adsorptive material may be any product with an affinity for organic/inorganic compounds. Examples of the adsorptive material include, but are not limited to, the following: carbonaceous char, activated carbon, reactivated carbon, zeolite, silica, silica gel, alumina clay, or a combination thereof. The selection of other adsorptive materials and method of application will be apparent to those skilled in the art.

Metals removal system 138 may further include a photocatalytic reaction vessel and/or unit 304 that is preferably located downstream from pretreatment unit 302, in one aspect. Effluent 142 may be flowed, transported, ducted, piped, etc. from pretreatment unit 302 through inlet 303 to photocatalytic reaction unit 304, in one aspect. Additionally, photocatalytic reaction unit 304 may have an outlet 309 for flowing effluent 142 out of photocatalytic reaction unit 304 for further processing as described herein. As discussed herein, where effluent 142 does not require pretreatment, then effluent 142 may be flowed, transported, ducted, piped, etc. directly to photocatalytic reaction unit 304.

Dissolved metals 140 are generally present in an oxidized valence state; therefore, reduction processes that transform the aqueous species into a solid or gaseous state are preferred for removal. An abundant supply of electrons for metal reduction can be generated through the irradiation of titanium dioxide with UV light (heterogeneous photocatalysis), in one embodiment.

The photocatalyst or photocatalytic material 305 used in photocatalytic reaction unit 304 can be any material that generates oxidizing radicals and free electrons upon irradiation with the appropriate wavelength. In one embodiment, the photocatalyst 305 is deposited on a support substrate. In another embodiment, the photocatalyst 305 is combined within or on the surface of an adsorbent material. In yet another embodiment, the photocatalyst 305 is not deposited on a support material, but rather is present as a slurry. In still yet another embodiment, the photocatalyst 305 is suspended in a slurry.

In one embodiment, photocatalyst 305 is titanium dioxide ($TiO_2$), which is a relatively nontoxic, stable, and inexpensive semiconductor material that is increasingly being applied for pollution control. The photocatalyst 305 is irradiated for freeing one or more electrons for reducing the oxidation state of dissolved metals 140.

In one embodiment, photocatalytic reaction unit 304 may reduce the oxidation state of the dissolved metals either to a lower valence electron level or to an elemental metal level. Some metals, such as Selenium, may not be reduced all the way to elemental but will still precipitate out in their less dissolved state as they become reduced. For example, $Se^{6+}$ may be reduced to $Se^{4+}$ by the photocatalytic reaction in photocatalytic reaction unit 304. In another example, $Se^{4+}$ may be reduced to elemental Se in photocatalytic reaction unit 304. Additionally, the oxidation state of other desirable metals, such as arsenic and mercury, may be reduced such that they are in a reduced oxidation state or are reduced to elemental metals.

Additionally, photocatalytic reaction unit 304 may include a source of ultraviolet light 307 with a wavelength in a range of from about 200 nm to about 400 nm. Preferably, source of ultraviolet light 307 produces ultraviolet light with a wavelength of approximately 254 nm. As noted above, the photocatalyst is titanium dioxide ($TiO_2$) and the irradiation wavelength is from about 400 nm to about 200 nm. Most preferably, the photocatalyst is $TiO_2$ and the irradiation wavelength of source of ultraviolet light 307 is 254 nm.

Figure 4:
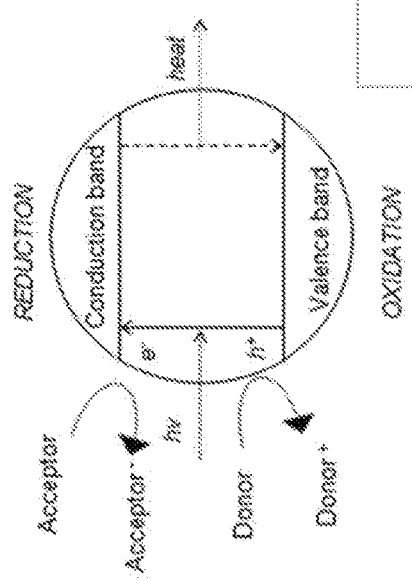
FIG. 4 is a diagram of the conduction band/valence band of titanium dioxide.

When irradiated, electrons within the semiconductor shift from its valence to conduction bands, generating pairs of electrons and electron holes in the crystal structure, as best shown in FIG. 4. These electrons and holes can either recombine, become trapped by surface sites, or participate in oxidation and reduction reactions with surrounding species. The oxidative reactions are promoted from the electron holes, and are generally applied to mineralize organics. Reduction pathways are promoted from the free electron, and may be applied for the treatment of metals. These reduction reactions are only feasible, however, if the potential of the reaction is greater than the energy associated with the conduction band edge of the $TiO_2$ ($E_{cb}$). The energy of the conduction band electron, which will shift with changes in the solution pH, can be calculated using the following equation: $E_{cb}(eV) = -0.05 - 0.059\ pH$ Applying pH limits to this equation, the energy of the conduction band electrons of irradiated $TiO_2$ range from $-0.817$ to $-0.05$ V. Therefore, barring interference with satellite compounds, any reduction pathway with a potential greater than $-0.05$ V may proceed. Table 2 below presents the reduction potential for select metal species. As shown, the electron generated from irradiated $TiO_2$ has the potential to reduce a number of metals of interest. For instance, aqueous selenium can be photocatalytically reduced to a solid, either depositing in solution or onto the $TiO_2$ surface. For those metals that are volatile in their reduced state, such as mercury and selenide, photocatalytic reduction will transfer the metal from the aqueous to gaseous phase.

In one embodiment, if the reduction potential is lower than $E_{cb}$, an adjustment to the solution pH may be sufficient to shift $E_{cb}$ and promote the desired reactions. It is important to recognize that metal speciation will certainly influence the potential required for reduction to occur. For example, divalent mercury is more easily reduced than mercury chloride complexes. Table 2 below provides some standard reduction potentials for various select metals. Nevertheless, Table 2 below should not be used as a rule to predict metals reduction in complex waters or wastewaters, but rather as an instructive guide identifying the possibility to remove aqueous metals via photocatalytic reduction.

TABLE 2

Standard reduction potentials (versus the NHE) for select metals.

| Metal | Chemical Equilibrium | $E^0$, V |
|---|---|---|
| Se(+6)/Se(+4) | $SeO_4^{2-}(aq) + 4H^+ + 2e^- \leftrightarrow H_2SeO_3^-(aq) + H_2O$ | +1.15 |
| Se(+4)/Se(0) | $H_2SeO_3(aq)^- + 4H^+ + 4e^- \leftrightarrow Se^0(s) + 3H_2O$ | +0.74 |
| Se(0)/Se(−2) | $Se^0 + H^+ + 2e^- \leftrightarrow HSe^-$ | −0.227 |
| Se(0)/Se(−2) | $Se^0 + 2e^- \leftrightarrow Se^{2-}$ | −0.641 |
| As(+5)/As(+3) | $H_3AsO_4(aq) + 2H^+ + 2e^- \leftrightarrow H_3AsO_3(aq) + H_2O$ | +0.56 |
| As(+3)/As(0) | $H_3AsO_3(aq) + 3H^+ + 3e^- \leftrightarrow As(s) + 3H_2O$ | +0.24 |
| As(0)/As(−3) | $As(s) + 3H^+ + 3e^- \leftrightarrow AsH_3(g)$ | −0.23 |
| Cr(6+)/Cr(3+) | $Cr_2O_7^{2-}(aq) + 14H^+ + 6e^- \leftrightarrow 2Cr^{3+}(aq) + 7H_2O$ | +1.33 |
| Cr(3+)/Cr(0) | $Cr^{3+}(aq) + 3e^- \leftrightarrow Cr^0(s)$ | −0.74 |
| Cd(2+)/Cd(0) | $Cd^{2+}(aq) + 2e^- \leftrightarrow Cd^0(s)$ | −0.4 |
| Cu(2+)/Cu(0) | $Cu^{2+}(aq) + 2e^- \leftrightarrow Cu^0(s)$ | +0.34 |
| Cu(+1)/Cu(0) | $Cu^+(aq) + e^- \leftrightarrow Cu^0(s)$ | +0.52 |
| Pb(2+)/Pb(0) | $Pb^{2+}(aq) + 2e^- \leftrightarrow Pb^0(s)$ | −0.13 |
| Hg(2+)/Hg(0) | $Hg^{2+}(aq) + 2e^- \leftrightarrow Hg^0$ | +0.854 |

In one embodiment, photocatalytic reduction of the dissolved metals 140 in photocatalytic reaction unit 304 may be enhanced with the addition of aqueous organic compounds. The efficiency of photocatalytically promoted reduction reactions is dependent upon the ability of the process to take advantage of the generated electrons. In general, this involves (1) avoiding electron-hole recombination, and (2) preventing unnecessary electron-scavenging reactions. The first can be accomplished by providing a sacrificial reducing agent—typically an organic compound that will react with the photocatalytically generated hole. In doing so, the hole is prevented from recombining with the freed electron.

While not wishing to be bound by theory, these organic compounds foster electron/hole charge separation on the irradiated photocatalyst by being oxidized by the hole, allowing the electron to remain free for reduction reactions. The oxidation of the organic acid may also generate radicals that can participate in metals reduction reactions. Preferably, the organic additives are nontoxic and are readily oxidized to innocuous byproducts by the irradiated photocatalyst. The type of organic additive may include, but is not limited to, the following: formic acid, salicylic acid, methanol, ethanol, and citric acid. Most preferably the additive is formic acid.

Similar to electron/hole recombination, satellite reactions that consume the photocatalytically generated electrons can also slow reduction processes. Dissolved oxygen is known to react with the promoted electrons through a number of pathways to form, for example, $HO_2^{*-}$ and $O_2^{*-}$ molecules. Preferably, electron scavengers should be removed from the water to maximize photocatalytic reduction of the target metal in photocatalytic reaction unit 304. This can be accomplished by purging with an inert gas such as nitrogen, applying a de-aeration system, adding an oxygen scavenger, or some combination thereof. Preferably, during photocatalytic reduction in photocatalytic reaction unit 304, the water or wastewater is continuously sparged with an inert gas. Most preferably, during photocatalytic reduction the water or wastewater is continuously sparged with nitrogen gas that has a purity greater than 95%.

In certain embodiments, the pH of the fluid stream may be adjusted to encourage photocatalytic reduction processes in photocatalytic reaction unit 304.

Metals removal system 138 may further include a volatile metal capture unit 306 that is located downstream of photocatalytic reaction unit 304. In certain embodiments where photocatalytic reduction promotes the volatilization of metals from solution, adsorption media may be applied to the contaminated gas stream to capture the volatized metal and prevent uncontrolled release into the atmosphere. The volatized metals from 304 may be flowed, transported, ducted, piped, etc. from photocatalytic reaction unit 304 to volatile metal capture unit 306, in one aspect. Volatile metal capture unit 306 may include adsorption media, or it may be located along a transport line and the like. Examples of the adsorptive material include, but are not limited to, the following: carbonaceous char, activated carbon, reactivated carbon, zeolite, silica, silica gel, alumina clay, or a combination thereof.

Metals removal system 138 may further include a photocatalyst separation unit 308 that is preferably located downstream from photocatalytic reaction unit 304, in one aspect. Effluent 142 may be flowed, transported, ducted, piped, etc. from photocatalytic reaction unit 304 to photocatalyst separation unit 308, in one aspect. Once aqueous metals concentrations have reached their target levels, photocatalyst 305, if used as a slurry, can be separated from solution by various means at photocatalyst separation unit 308. Some exemplary processes for separating photocatalyst 305 from the solution include gravity separation (i.e., clarifiers), hydrocyclones, filtration, or some combination thereof.

Metals removal system 138 may further include a used photocatalyst storage unit 310 that is preferably located downstream of photocatalyst separation unit 308. The recovered photocatalyst 305 from photocatalyst separation unit 308 may be flowed, transported, ducted, piped, etc. from photocatalyst separation unit 308 to used photocatalyst storage unit 310, in one aspect.

Metals removal system 138 may further include a photocatalyst recycle line 312 that is preferably in communication with photocatalyst separation unit 308. The recovered photocatalyst 305 from photocatalyst separation unit 308 may be flowed, transported, ducted, piped, etc. through photocatalyst recycle line 312 for providing it to photocatalytic reaction unit 304 for reusing, recycling, and the like in photocatalytic reaction unit 304, in one aspect.

Metals removal system 138 may further include a photocatalyst regeneration unit 314 that is preferably located downstream from used photocatalyst storage unit 310, in one aspect. Recovered photocatalyst 305 may be flowed, transported, ducted, piped, etc. from used photocatalyst storage unit 310 to photocatalyst regeneration unit 314, in one aspect. In one embodiment of the invention, regeneration of photocatalyst 305 can be accomplished by stripping the metal deposits from the photocatalyst surface by, for example, changing the slurry pH at photocatalyst regeneration unit 314. In another embodiment, the photocatalyst may be thermally regenerated at photocatalyst regeneration unit 314. In still yet another embodiment, the solid (often elemental) metals can be photocatalytically oxidized to resolubilize the metal. This approach will essentially reverse the photocatalytic reduction process that originally removed the metal from the large volume wastewater stream, thereby concentrating the metals in a smaller volume of water for disposal as a hazardous waste as further described below.

Metals removal system 138 may further include a photocatalyst disposal unit 316 that is preferably located downstream from used photocatalyst storage unit 310, in one aspect. Photocatalyst 305 that cannot be regenerated at photocatalyst regeneration unit 314 may be flowed, transported, ducted, piped, etc. from used photocatalyst storage unit 310 to photocatalyst disposal unit 316, in one aspect.

Metals removal system 138 may further include a regenerated photocatalyst recycle line 318 that is preferably in communication with photocatalyst regeneration unit 314. The regenerated photocatalyst 305 from photocatalyst regeneration unit 314 may be flowed, transported, ducted, piped, etc. through regenerated photocatalyst recycle line 318 for providing it to photocatalytic reaction unit 304 for reusing, recycling, and the like in photocatalytic reaction unit 304, in one aspect.

Metals removal system 138 may further include a regeneration waste unit 320 that is preferably located downstream from photocatalyst regeneration unit 314, in one aspect. Photocatalyst 305 that was not regenerated at photocatalyst regeneration unit 314 may be flowed, transported, ducted, piped, etc. from photocatalyst regeneration unit 314 to regeneration waste unit 320, in one aspect.

Metals removal system 138 may further include a treatment effluent unit 322 that is preferably located downstream from photocatalyst separation unit 308, in one aspect. The overflow or filtrate from photocatalyst separation unit 308 may be flowed, transported, ducted, piped, etc. from photocatalyst separation unit 308 to treatment effluent unit 322, in one aspect. Metals removal system 138 may further include a polishing unit 324 that is preferably located downstream from treatment effluent unit 322, in one aspect. The treated effluent may be flowed, transported, ducted, piped, etc. from treatment effluent unit 322 to polishing unit 324, in one aspect. Metals removal system 138 may further include a discharge unit 326 that is preferably located downstream from polishing unit 324, in one aspect.

EXAMPLES

The following non-limiting examples document the unexpected results obtained when combining adsorption by activated carbon and photocatalytic reduction for selenium removal from flue gas desulfurization wastewater. It is to be understood that the spirit and scope of this invention are not limited to the detailed description above or the following examples.

Example 1

WFGD wastewater collected from a 348 megawatt (MW) coal-fired power generating station was treated to remove selenium (initial concentration of 0.26 mg/L). The value of treating the wastewater with activated carbon (AC) prior to photocatalytic reduction was evaluated using the following protocols:

Method 1: (Photocatalysis) 5 grams (g) of $TiO_2$ (Degussa P-25) was magnetically agitated with 100 milliliters (mL) of scrubber wastewater with UV irradiation (254 nm) for 1 hr. The sample was de-oxygenated using 1 gram/liter (g/L) of sodium sulfite.

Method 2: (Adsorption, Activated Carbon) 100 milligrams (mg) of powdered activated carbon was magnetically agitated with 100 mL of wastewater in the dark for 1 hr. The sample was de-oxygenated using 1 g/L of sodium sulfite.

Method 3: (Adsorption followed by Photocatalysis) 100 mg of powdered activated carbon was magnetically agitated with 100 mL of wastewater in the dark for 1 hr. Subsequently, the slurry was filtered. The filtrate was then treated with 5 grams of $TiO_2$ (Degussa P-25), magnetically agitated with UV irradiation (254 nm) for 1 hr.

Figure 5:
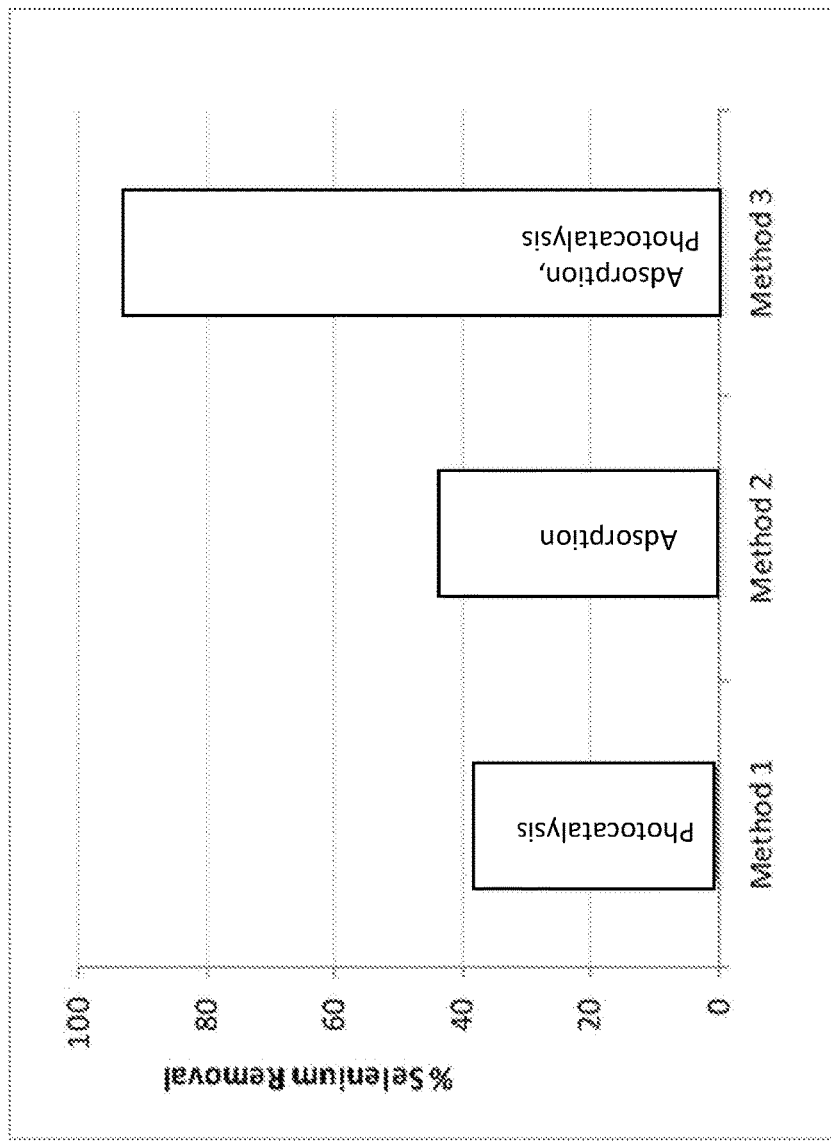
FIG. 5 is a bar graph showing the results of removing selenium from wastewater streams according to an embodiment.

As shown in FIG. 5, photocatalysis and adsorption onto activated carbon (Methods 1 and 2) removed only about 38% and 44% of the dissolved selenium, respectively. However, when photocatalytic reduction was preceded by pretreatment with activated carbon, removal increased to 85%, reaching the detection limits of the instrumentation.

Example 2

Mercury removal from a volume of WFGD blowdown collected from a 348 MW coal-fired power generating station (initial Hg concentration of 40.1 ng/L) was studied using the following protocol (example 1, Method 3): 100 mg of powdered activated carbon was magnetically agitated with 100 mL of wastewater in the dark for 1 hr. Subsequently, the slurry was filtered. The filtrate was then combined with 5 grams of $TiO_2$ (Degussa P-25) and magnetically agitated with UV irradiation (254 nm) for 1 hr. This process removed greater than 99.9% of the mercury, lowering the aqueous concentration to 0.052 ng/L.

Example 3

A WFGD wastewater collected from a surge pond effluent stream of a 2567 MW coal-fired power generating station was treated for selenium removal (initial concentration of 2.42 mg/L). The value of a nitrogen purge to lower the dissolved oxygen content of the wastewater was evaluated using the following protocols:

Method 1: (No purge) 100 mg of powdered activated carbon was magnetically agitated with 100 mL of wastewater in the dark for 180 sec. Subsequently, the slurry was filtered. The filtrate was then combined with 5 grams of $TiO_2$ (Degussa P-25), magnetically agitated with UV irradiation (254 nm) for 1 hr.

Method 2: (With N2 purge) 100 mg of powdered activated carbon was magnetically agitated with 100 mL of wastewater in the dark for 180 sec. Subsequently, the slurry was filtered. The filtrate was then combined with 5 grams of $TiO_2$ (Degussa P-25), magnetically agitated with UV irradiation (254 nm) for 1 hr with a constant purge of ultrahigh purity nitrogen (0.1 Lpm).

Treating the scrubber wastewater with activated carbon followed by photocatalytic reduction without a nitrogen purge (Method 1) lowered the dissolved selenium concentration by about 55%. Reducing the dissolved oxygen concentration with the nitrogen purge (Method 2) improved removal by about 30%, for a total selenium removal of 84%. These data confirm that the presence of dissolved oxygen hinders photocatalytic reduction of selenium, and that purging the system with nitrogen enhances performance.

Example 4

WFGD wastewater collected from a 3,499 MW coal-fired power generating station was treated for selenium removal (initial concentration of 0.134 mg/L). The value of adding formic acid to the photocatalytic reduction step was evaluated using the following protocols:

Method 1: (no Formic Acid) 100 mg of powdered activated carbon was magnetically agitated with 100 mL of wastewater in the dark for 1 hr. Subsequently, the slurry was filtered. The filtrate was then treated with 5 grams of $TiO_2$ (Degussa P-25) and then magnetically agitated with UV irradiation (254 nm) for 1 hr.

Method 2: (with Formic Acid) 100 mg of powdered activated carbon was magnetically agitated with 100 mL of wastewater in the dark for 1 hr. Subsequently, the slurry was filtered. The filtrate was then treated with 5 grams of $TiO_2$ (Degussa P-25) and formic acid, and then magnetically agitated with UV irradiation (254 nm) for 1 hr.

The addition of formic acid as a sacrificial organic acid increased selenium removal from 57% to 87%, achieving a final selenium concentration of 0.017 mg/L in just one hour.

Example 5

WFGD wastewater collected from a 3,499 MW coal-fired power generating station was treated for selenium removal (initial concentration of 0.134 mg/L). The influence of formic acid concentration over the photocatalytic reduction step was evaluated using the following protocols:

Method 1: (no Formic Acid) 100 mg of powdered activated carbon was magnetically agitated with 100 mL of wastewater in the dark for 1 hr. Subsequently, the slurry was filtered. 5 grams of $TiO_2$ (Degussa P-25) was added to the filtrate and then magnetically agitated with UV irradiation (254 nm) for 1 hr.

Method 2: (with Formic Acid, 3:1 molar ratio of Formic Acid to Selenium) 100 mg of powdered activated carbon was magnetically agitated with 100 mL of wastewater in the dark for 1 hr. Subsequently, the slurry was filtered. 5 grams of $TiO_2$ (Degussa P-25) and formic acid were added to the filtrate, and then magnetically agitated with UV irradiation (254 nm) for 1 hr.

Method 3: (with Formic Acid, 6:1 molar ratio of Formic Acid to Selenium) 100 mg of powdered activated carbon was magnetically agitated with 100 mL of wastewater in the dark for 1 hr. Subsequently, the slurry was filtered. 5 grams of $TiO_2$ (Degussa P-25) and formic acid were added to the filtrate, and then magnetically agitated with UV irradiation (254 nm) for 1 hr.

Figure 6:
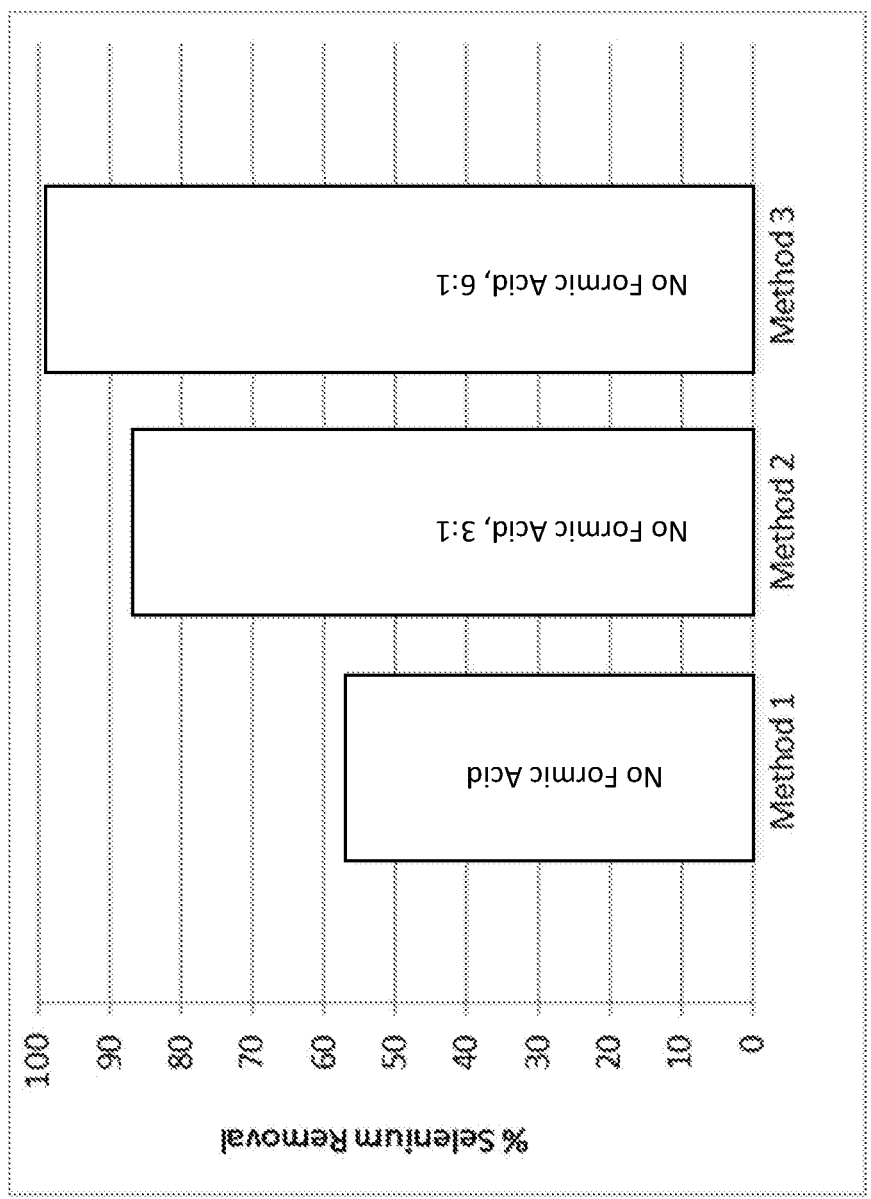
FIG. 6 is a bar graph showing the results of removing selenium from wastewater streams according to an embodiment.

As shown in FIG. 6, increasing concentrations of formic acid during the photocatalytic reduction step improved selenium removal, such that greater than 99% of the selenium was removed within one hour.

Figure 7:
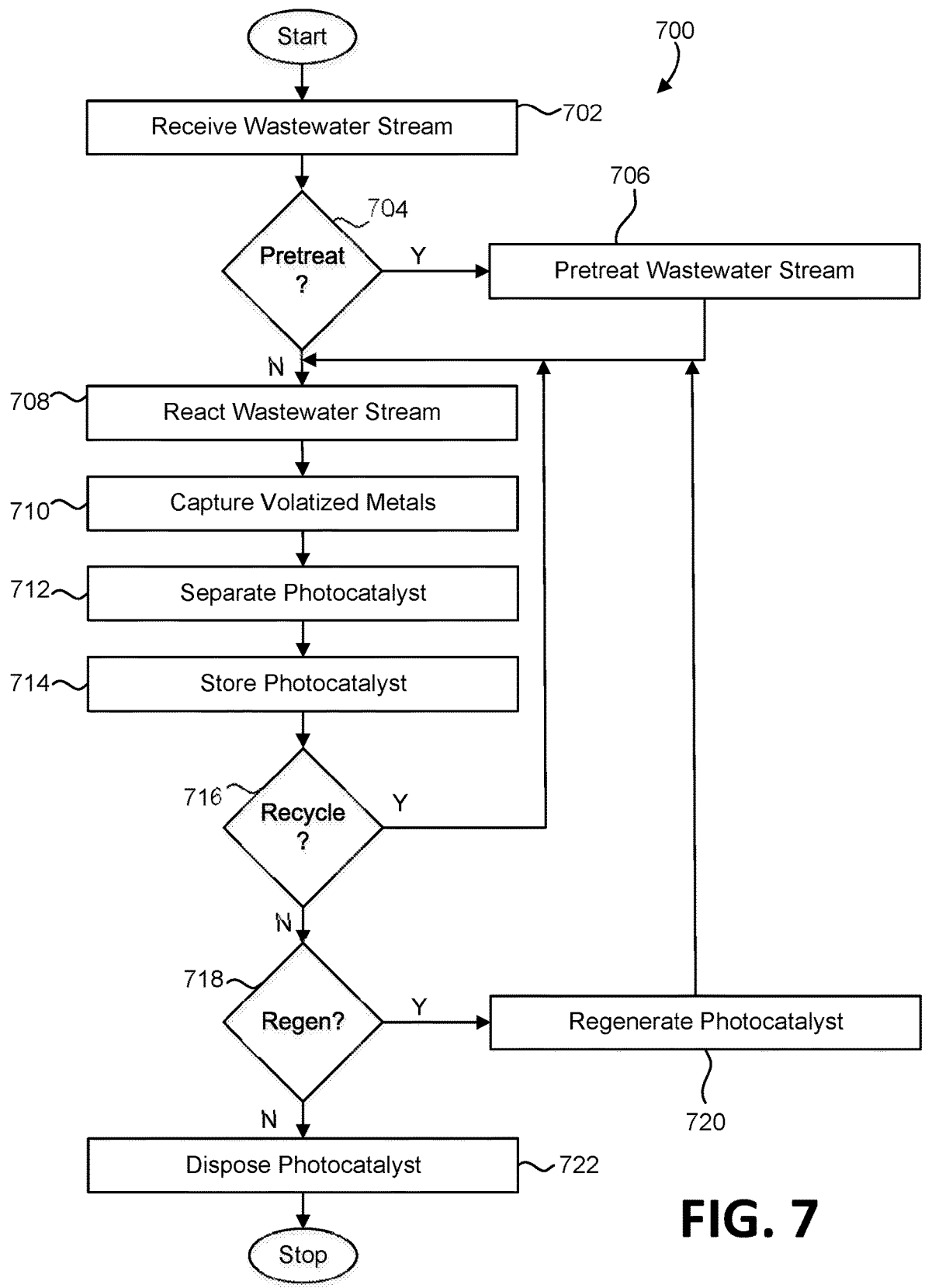
FIG. 7 is a flowchart of a process for removing metals from wastewater streams according to an embodiment.

In one embodiment, the present invention may include methods for removing dissolved metals from wastewater streams. Referring now to FIG. 7, an embodiment of a method for removing dissolved metals from wastewater streams is schematically illustrated and generally designated 700. In step 702, a wastewater stream/effluent 142 is transferred from any source to any of the units of system 100 as described herein by any known means. In step 704, an inquiry is made about whether effluent 142 requires pretreatment prior to transferring it to metals removal system 138. If the answer to this inquiry is yes, then in step 706 effluent 142 is transferred to pretreatment unit 302 for pretreating as described above. After pretreatment, effluent 142 is transferred to metals removal system 138. If the answer to the inquiry is no, effluent 142 may be directly transferred to metals removal system 138.

In step 708, effluent 142 is treated in metals removal system 138 as described above. This step may include injecting photocatalyst, organic additives, sparging effluent 142, and irradiating the photocatalyst for providing electrons for reducing the oxidation state of dissolved metals 140 as described above. As described above, preferably the photocatalyst is titanium dioxide and the wavelength of source of ultraviolet light 307 is preferably from about system 200 nm to about 400 nm, and more preferably 254 nm. This step may further include agitating the solution for better mixing and reacting. This step may further include adding an electron scavenger remover as described herein.

In step 710, any dissolved metals 140 that are volatized into a gaseous phase are captured in adsorption media as described above. In step 712, effluent 142 may be transferred to photocatalyst separation unit 308 where the photocatalyst is recovered from the effluent 142. In step 714, photocatalyst may be stored or sent directly to a recycling unit. In one embodiment, photocatalyst is transferred to used photocatalyst storage unit 310 as described herein and as seen in step 714.

In step 716, an inquiry is made about whether the photocatalyst needs to be recycled as described above. If the answer to this inquiry is yes, then photocatalyst may be transferred back to metals removal system 138. If the answer to this inquiry is no, then in step 718 another inquiry is made regarding whether photocatalyst should be disposed of or whether it should be regenerated. If the answer to this inquiry is yes, then the photocatalyst is transferred to photocatalyst regeneration unit 314 where it is regenerated as further described herein. This step may further include transferring the regenerated photocatalyst back to metals removal system 138. If the answer to this inquiry is no, then the photocatalyst may be disposed of as shown in step 722.

Figure 8:
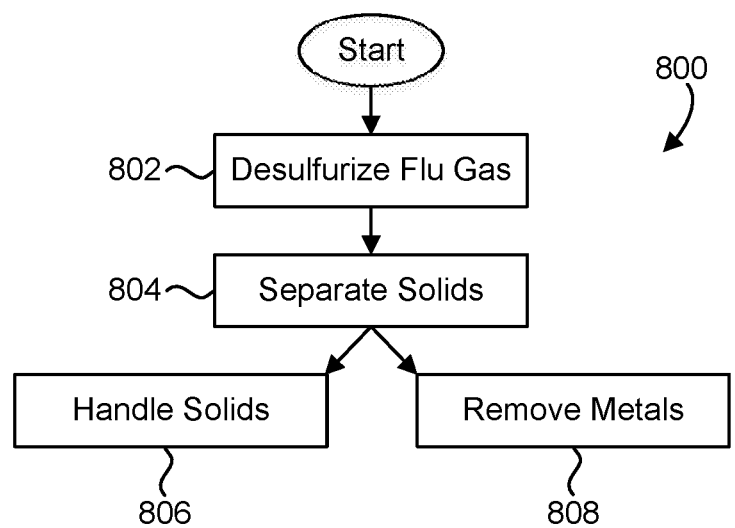
FIG. 8 is a flowchart of a process for removing metals from wastewater streams according to another embodiment.

In one embodiment, the present invention may include methods for removing dissolved metals from wastewater streams. Referring now to FIG. 8, an embodiment of a method for removing dissolved metals from wastewater streams is schematically illustrated and generally designated 800. In step 802, effluent 142 may be desulfurized, such as in WFGD 136, for example. In step 804, solids may be separated from effluent 142 at solids separation unit 206 in one embodiment. In step 806, the separated solids may then be handled at solids handling unit 208 in one embodiment. In step 808, dissolved metals 140 may be removed from effluent at metals removal system 138 as described herein.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

What is claimed is:

1. A photocatalytic reaction unit for removing dissolved metals from a wastewater stream, comprising:
   a photocatalytic reaction vessel having an inlet and an outlet for providing passage of the wastewater stream into and out of the photocatalytic reaction vessel;
   a photocatalyst in contact with the wastewater stream including selenium and mercury;
   an ultraviolet light source for emitting ultraviolet light into the photocatalytic reaction vessel; and
   a pretreatment unit disposed upstream of and in fluid communication with the photocatalytic reaction unit for pretreatment of said selenium and mercury, the pretreatment unit providing one or more pretreatments selected from the group consisting of hydrogen peroxide/ultraviolet light treatment, ozonation, photo-Fenton treatment, ultraviolet light treatment, treatment by a slurry of photocatalyst irradiated with ultraviolet light, wherein a photocatalytic reaction occurs for said dissolved metals consisting essentially of selenium and mercury.

2. The photocatalytic reaction unit as recited in claim 1, wherein the photocatalyst is titanium dioxide.

3. The photocatalytic reaction unit as recited in claim 1, wherein the wavelength of the ultraviolet light source is from about 200 nm to about 400 nm.

4. The photocatalytic reaction unit as recited in claim 1, wherein the wavelength of the ultraviolet light source is 254 nm.

5. The photocatalytic reaction unit as recited in claim 1, further comprising:
   at least one organic additive selected from the group consisting of formic acid, salicylic acid, methanol, ethanol, and citric acid for fostering electron/hole charge separation on the irradiated photocatalyst in the photocatalytic reaction vessel.

6. The photocatalytic reaction unit as recited in claim 1, further comprising:
   at least one electron scavenger remover selected from the group consisting of purging with an inert gas, applying a de-aeration system, and adding an oxygen scavenger for decreasing the concentration in the photocatalytic reaction vessel of electron scavengers.

7. The photocatalytic reaction unit as recited in claim 1, further comprising:
   a regeneration unit for regenerating the photocatalyst, the regeneration unit selected from the group consisting of changing the slurry pH, thermal regeneration, photocatalytic oxidation, or combination thereof.

8. A system for removing dissolved metals from a wastewater stream, comprising:
   a photocatalytic reaction vessel having an inlet and an outlet for providing passage of the wastewater stream into and out of the photocatalytic reaction vessel, said wastewater stream including selenium and mercury;
   a photocatalyst;
   an ultraviolet light source for emitting ultraviolet light into the photocatalytic reaction vessel; and
   a photocatalyst regeneration unit disposed downstream from said photocatalytic reaction vessel for regenerating the photocatalyst, the regeneration unit selected from the group consisting of changing a pH of a slurry carrying said photocatalyst, thermal regeneration, photocatalytic oxidation, or combination thereof, wherein a photocatalytic reaction occurs for said dissolved metals consisting essentially of selenium and mercury.

9. The system as recited in claim 8, further comprising:
   a volatile metal capture unit disposed downstream from said photocatalytic reaction vessel for capturing volatized metals.

10. The system as recited in claim 8, further comprising:
    a pretreatment unit disposed upstream of and in fluid communication with the photocatalytic reaction unit, the pretreatment unit providing one or more pretreatments selected from the group consisting of hydrogen peroxide/ultraviolet light treatment, ozonation, photo-Fenton treatment, ultraviolet light treatment, treatment by hypochlorite ions, treatment by a slurry of photocatalyst irradiated with ultraviolet light, sedimentation treatment, filtration treatment, chemical treatment, and an adsorption process for pretreating the wastewater stream prior to reacting in the photocatalytic reaction vessel.

11. The system as recited in claim 8, further comprising:
    a photocatalyst separation unit disposed downstream of and in fluid communication with the photocatalytic reaction vessel for separating the photocatalyst from the wastewater stream.

12. The system as recited in claim 11, further comprising:
a photocatalyst storage unit disposed downstream of and in fluid communication with the photocatalyst separation unit for storing the photocatalyst.

13. The system as recited in claim 12, further comprising:
a photocatalyst recycle line providing fluid communication between the photocatalyst storage unit and the photocatalytic reaction vessel for providing photocatalyst from the photocatalyst storage unit to the photocatalytic reaction vessel.

14. The system as recited in claim 8, further comprising:
a regenerated photocatalyst recycle line in fluid communication between the photocatalyst regeneration unit and the photocatalytic reaction vessel for providing photocatalyst from the regenerated photocatalyst recycle line to the photocatalytic reaction vessel.

\* \* \* \* \*

UNITED STATES PATENT AND TRADEMARK OFFICE
CERTIFICATE OF CORRECTION

| | | |
|---|---|---|
| PATENT NO. | : 10,947,132 B2 | Page 1 of 1 |
| APPLICATION NO. | : 15/486580 | |
| DATED | : March 16, 2021 | |
| INVENTOR(S) | : David W. Mazyck, Heather McKenna and Christine O. Valcarce | |

It is certified that error appears in the above-identified patent and that said Letters Patent is hereby corrected as shown below:

On the Title Page

Item (12) should read: Mazyck et al.

Inventor name David W. Mazyek is corrected to read "David W. Mazyck"

Signed and Sealed this
Nineteenth Day of September, 2023

Katherine Kelly Vidal
*Director of the United States Patent and Trademark Office*